US011140554B2

(12) United States Patent
Schouler

(10) Patent No.: US 11,140,554 B2
(45) Date of Patent: Oct. 5, 2021

(54) MANAGEMENT OF A MULTI-SIM OFFER WITH MULTIPLE ACTIVATION CODES

(71) Applicant: Orange, Paris (FR)

(72) Inventor: Eric Schouler, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 155 days.

(21) Appl. No.: 16/335,415

(22) PCT Filed: Sep. 26, 2017

(86) PCT No.: PCT/FR2017/052580
§ 371 (c)(1),
(2) Date: Mar. 21, 2019

(87) PCT Pub. No.: WO2018/060583
PCT Pub. Date: Apr. 5, 2018

(65) Prior Publication Data
US 2020/0021980 A1 Jan. 16, 2020

(30) Foreign Application Priority Data
Sep. 29, 2016 (FR) ...................... 1659317

(51) Int. Cl.
*H04W 12/30* (2021.01)
*H04W 8/20* (2009.01)
(Continued)

(52) U.S. Cl.
CPC ........... *H04W 12/35* (2021.01); *H04W 8/205* (2013.01); *H04W 12/45* (2021.01); *H04W 60/00* (2013.01)

(58) Field of Classification Search
CPC ....... H04W 12/0023; H04W 12/00405; H04W 8/205; H04W 60/00; H04W 12/08; H04W 12/04
See application file for complete search history.

(56) References Cited

U.S. PATENT DOCUMENTS

2009/0217348 A1* 8/2009 Salmela ................ H04W 12/06
726/2
2012/0117635 A1* 5/2012 Schell ..................... G06F 21/34
726/9
(Continued)

FOREIGN PATENT DOCUMENTS

EP 2461613 A1 6/2012
WO 2017/061800 A1 4/2017

OTHER PUBLICATIONS

Notice of Allowance dated Jun. 4, 2020 from the U.S. Patent and Trademark Office for corresponding U.S. Appl. No. 16/335,429, filed Mar. 21, 2019.
(Continued)

*Primary Examiner* — Matthew Smithers
*Assistant Examiner* — Mirza Israr Javed
(74) *Attorney, Agent, or Firm* — David D. Brush; Westman, Champlin & Koehler, P.A.

(57) ABSTRACT

Method and apparatus for configuring a security module connected to a telecommunication terminal in a framework of a multi-SIM offer. In particular, a control server allocates a set of N activation codes corresponding to a subscription including a plurality of N profiles to allocate to a set of N respective terminals, and thus implements the steps: a) after activation of a first code with a first terminal, allocating a profile to the first terminal and recording a connection of the allocated profile to the first terminal, b) for a new request for allocating a current profile to a current terminal, allocating the current profile to the current terminal, if: no connection of this current terminal to a profile is recorded, and no connection of this current profile to a terminal is recorded, and recording the connection of the current profile to the current terminal.

13 Claims, 3 Drawing Sheets

(51) Int. Cl.
  *H04W 60/00* (2009.01)
  *H04W 12/45* (2021.01)

(56) References Cited

U.S. PATENT DOCUMENTS

| | | | | |
|---|---|---|---|---|
| 2012/0331292 | A1* | 12/2012 | Haggerty | H04L 63/0853 713/168 |
| 2013/0067026 | A1* | 3/2013 | Hershko | H04L 61/2589 709/217 |
| 2013/0165073 | A1* | 6/2013 | Madsen | H04W 8/18 455/411 |
| 2013/0227646 | A1* | 8/2013 | Haggerty | H04L 63/06 726/3 |
| 2014/0024343 | A1* | 1/2014 | Bradley | H04L 63/08 455/411 |
| 2014/0162622 | A1* | 6/2014 | Oda | H04W 4/08 455/419 |
| 2015/0382178 | A1* | 12/2015 | Park | H04W 12/06 455/411 |
| 2016/0044495 | A1* | 2/2016 | Schell | H04W 12/0023 455/419 |
| 2016/0241537 | A1* | 8/2016 | Cha | G06F 21/31 |
| 2016/0283216 | A1* | 9/2016 | Gao | H04L 67/303 |
| 2016/0353274 | A1* | 12/2016 | Chichierchia | H04B 1/3816 |
| 2016/0379006 | A1 | 12/2016 | Merrien et al. | |
| 2017/0180349 | A1* | 6/2017 | Park | H04L 63/20 |
| 2017/0302781 | A1* | 10/2017 | Massinissa Magini | H04M 1/72552 |
| 2019/0208405 | A1* | 7/2019 | Park | H04W 88/18 |
| 2019/0313241 | A1* | 10/2019 | Ahmed | H04W 12/0609 |
| 2019/0324735 | A1* | 10/2019 | Park | H04W 12/00522 |
| 2020/0021975 | A1* | 1/2020 | Schouler | H04W 12/37 |

OTHER PUBLICATIONS

English translation of the Written Opinion of the International Searching Authority, dated Nov. 14, 2017 for corresponding International Application No. PCT/FR2017/052578 filed Sep. 26, 2017.
English translation of the Written Opinion of the International Searching Authority, dated Dec. 12, 2017 for corresponding International Application No. PCT/FR2017/052580, filed Sep. 26, 2017.
Office Action dated Nov. 15, 2019 for corresponding U.S. Appl. No. 16/335,429, filed Mar. 21, 2019.
International Search Report dated Dec. 1, 2017 for corresponding International Application No. PCT/FR2017/052580, filed Sep. 26, 2017.
Written Opinion of the International Searching Authority dated Dec. 1, 2017 for corresponding International Application No. PCT/FR2017/052580, filed Sep. 26, 2017.
GSM Association SGP.22—RSP Technical Specification, Version 1.1, Jun. 9, 2016.
International Search Report dated Oct. 27, 2017 for corresponding International Application No. PCT/FR2017/052578, filed Sep. 26, 2017.
Written Opinion of the International Searching Authority dated Oct. 27, 2017 for corresponding International Application No. PCT/FR2017/052578, filed Sep. 26, 2017.
"SGP.22—RSP Technical Specification" v.1.1 dated Jun. 9, 2016.
"RSP Architecture" technical specification, version 1.0, dated Dec. 23, 2015.
Notice of Allowance dated Mar. 24, 2020 from the U.S. Patent and Trademark Office for corresponding U.S. Appl. No. 16/335,429, filed Mar. 21, 2019.

* cited by examiner

MANAGEMENT OF A MULTI-SIM OFFER WITH MULTIPLE ACTIVATION CODES

CROSS-REFERENCE TO RELATED APPLICATIONS

This Application is a Section 371 National Stage Application of International Application No. PCT/FR2017/052580, filed Sep. 26, 2017, the content of which is incorporated herein by reference in its entirety, and published as WO 2018/060583 on Apr. 5, 2018, not in English.

FIELD OF THE DISCLOSURE

This invention relates to the management of the security processor of one or more telecommunication terminals.

BACKGROUND OF THE DISCLOSURE

Such security processor is commonly referred to as a "SIM card" for "Subscriber Identity Module".

There are so-called "multi-SIM" offers allowing clients of an operator to benefit from a single contract while authorizing several terminals to be associated with this contract. The multi-SIM offers then involve providing several SIM cards for the same contract. On the one hand, clients no longer need to extract their SIM processor from a device in order to insert it into another device to be used. On the other hand, several terminals can be active simultaneously.

In addition, an increasing number of terminals do not directly include a physical security processor, of SIM-card type, but rather a security processor in the form of a software module directly embedded in the terminal. These are so-called "embedded SIM" or eSIM cards, which are in most cases "soldered" to the terminals. The increasingly frequent use of eSIM modules requires the adaptation of multi-SIM offers and more particularly providing not only several physical SIM cards but also several profiles, each of which must be downloaded by the client. The need to download the profiles leads the client to make this request without the control of the operator. However, without ad hoc control, clients may mistakenly request inconsistent downloads.

SUMMARY

This invention improves the situation.

To this end, it proposes a method, implemented by a control server, for configuring a security module associated with a telecommunication terminal, wherein the control server allocates a set of N activation codes corresponding to a subscription including a plurality of N profiles to be allocated to a set of N respective terminals. The method then involves the following steps:

a) after the activation of a first code in a first terminal, allocating a profile to the first terminal and recording an association of the profile allocated to the first terminal, (b) for a new request to allocate a current profile to a current terminal, allocating the current profile to the current terminal if:

no association of this current terminal with a profile is recorded, and no association of this current profile with a terminal is recorded and recording the association of the current profile with the current terminal.

Thus, a client who has subscribed to a multi-SIM offer in particular cannot use the same activation code several times to allocate a profile to two different terminals, or conversely to allocate a new profile to one of his terminals that has already received a profile (unless he disassociates the previous profile from this terminal, as discussed later on).

Thus, in an embodiment, the subscription comprising a plurality of N profiles to be allocated to a set of N respective terminals is related to a multi-SIM offer.

The method may include, prior to step a), the recording of N profiles and N activation codes, in association with said subscription, and thus:

b) for a new request to allocate a current profile to a current terminal and based on one of the N activation codes of said set, the control server allocates the current profile to the current terminal if:

no association of this current terminal with a profile is recorded, and no association of this current profile with a terminal is recorded, and records the association of the current profile, identified among the N profiles of the subscription, with said current terminal.

For this preliminary step, the control server may communicate with a computer entity comprising a man/machine interface available to a client of this subscription, in order to receive from the client at least the number N of profiles to be allocated to the respective terminals of the client. At the end of this step, the client can receive the N activation codes allowing him or her to request profiles for his or her terminals.

In an embodiment, the control server can reject the request to allocate the current profile to the current terminal if an association of this current terminal with a profile has already been previously recorded. Nevertheless, as indicated above, such embodiment allows a variant in which the previously associated profile for this terminal can be disassociated, for example with the permission of the subscription client, and then the requested new profile is allocated to this terminal.

In an embodiment, the control server rejects the request to allocate the current profile to the current terminal if an association of this current profile with a terminal has already been previously recorded. The identification of the current profile can be done with the control server, for example depending on the activation code. Again, such embodiment allows a variant in which the profile that is previously associated with another terminal can be disassociated, for example with the permission of the subscription client, and then this requested current profile is allocated to the current terminal with the permission of the subscription client.

As detailed later on, after entering a current activation code at a terminal, the control server, in an embodiment, receives from this terminal at least one data (called "MatchingID") corresponding to the current activation code and allowing the control server to verify whether a profile corresponding to the current activation code has already been associated with a terminal. Such embodiment makes it possible, for example, to control whether a profile thereby identified (through the data corresponding to the activation code) has already been allocated to a terminal.

In addition, in an embodiment:

after entering the current activation code in the current terminal, the control server receives from this current terminal at least one security module identifier associated with the terminal, and verifies whether a profile among the N profiles has already been allocated for a terminal having said security module identifier.

Such embodiment also makes it possible to verify whether a given terminal has already been allocated a profile.

The invention has an advantageous application in cases where the security modules of the terminals are software modules embedded directly in the respective terminals. Indeed, usually, a physical SIM card is pre-associated with a given profile, but this is not the case with terminals with integrated e-SIM software modules.

In addition, the control server performing these verifications, particularly in an information system of an operator to which the offer is subscribed, is advantageous because activations and profile installations are usually performed by access servers of SMDP or SMDP+ type. Thus, in such embodiment, data from the current terminal received from the control server, before a profile is allocated to this terminal, transits via such access server.

Similarly, data for installing a profile in a terminal is, in such embodiment, sent by the control server and transmitted to the terminal via such access server.

This invention also covers a computer program with instructions for the implementation of the above method, when the program is executed by a processor.

This invention also covers a control server, including at least one processing circuit in order to perform the steps of the above method.

The control server can further include a communication interface with an access server (e.g. of SMDP+ type), and possibly also a communication interface with a computer entity including a man/machine interface available to a subscription client in order to record at least a number N of profiles associated with the subscription and to be allocated.

As illustrated in FIG. 5 as an example, the control server OPE, for the implementation of the above method, may include for example:
- an interface COM for communicating with the access server (for example SMDP+), as well as with the client in order to receive the multi-SIM command,
- a memory MEM unit storing instructions of a computer program as defined in the invention, as well as a connection to a database BD storing in particular profile/terminal association records, and
- a processing circuit comprising, for example, a processor PROC and cooperating with the working memory MEM and the database BD, for carrying out the method described above.

BRIEF DESCRIPTION OF THE DRAWINGS

Other advantages and characteristics of the invention will appear from the examples of embodiments presented in the detailed description below, and from the examination of the annexed drawings on which.

DETAILED DESCRIPTION OF ILLUSTRATIVE EMBODIMENTS

Figure 1:
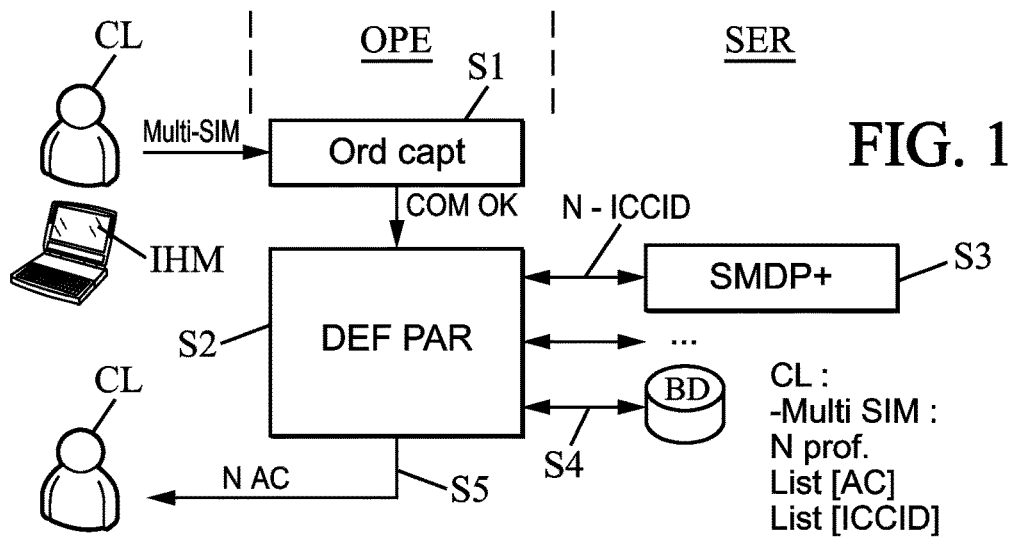
FIG. 1 illustrates a global operation of defining a multi-Sim offer by a client CL and its processing with an OPE server as defined in the invention.

This invention provides efficient processing for performing consistency controls on profile downloads. The standardization works of the GSMA association have not proposed a way to control profile downloads, particularly in the case of a multi-SIM offer. It is then proposed to use in particular the ability to control the profile download and the installation reports, offered in particular by eSIM architectures being standardized, in order to define the construction of a repository (as presented below with reference to FIG. 1) for each client whose information data allows the control steps, presented with reference to FIG. 2 in particular, to be carried out. An access profile is a set of data and applications that allow a mobile device, once the profile is activated, to access the network of an operator.

The rest of this description presents examples of several embodiments applying to a security module of eUICC card type as being standardized in the framework of the GSMA association, but the management method also applies to other types of security modules. More generally, the security module is a dedicated tamper-proof platform, including hardware and software, capable of securely hosting applications and their confidential and cryptographic data and providing a secure application execution environment, such as an UICC-type card.

The security module is typically an "eUICC"-type card (embedded Universal Integrated Circuit Card), also called "eSIM" (embedded Subscriber Identity Module), or irremovable SIM card. There are no limitations attached to this type of card. In a particular embodiment, the security module is a smart card with an operating system offering the functionalities of an eUICC-type card. In another particular embodiment, the security module is integrated into the terminal, thus forming a single entity.

The following description is in the context of the technical specifications, as defined by the GSMA association. More specifically, the remote configuration management architecture is defined in the "RSP Architecture" technical specification, version 1.0, dated 23 Dec. 2015 and the procedures are defined in the "SGP.22—RSP Technical Specification" v.1.1 dated 9 Jun. 2016.

In the context of the use case presented here, the client CL has a number N of terminals (smartphones, and/or tablet, etc., adapted for telephony applications or more generally for communication using a security processor, such as a SIM card, or eSIM module). The client CL subscribes to a multi-SIM offer for all its N terminals, and must fill in the profile of each terminal in his or her offer. As described later on, this profile definition is carried out by an interaction between the client user CL (or a man/machine interface IHM (FIG. 1) available to the user) and a control server OPE connected to the information system of an operator with which the multi-SIM offer is subscribed. A technical constraint is also necessary: as long as no profile is installed in a terminal TER, the latter can only communicate with an access server SER (called SMDP server in the current GSMA standard, or SMDP+ below), but cannot communicate directly with the information system of the operator. However, as described below, the SER server can carry out a preparation of the subscription management data, in cooperation with the control server OPE.

With reference to FIG. 1, the client CL communicates with the control server OPE or more generally with the information system of the operator (via an IHM interface) in order to request a multi-SIM offer. In step S1, the information system enters this command and after validation transmits it to the control server OPE. In step S2, the control server OPE defines the parameters associated with this command, including:

the number N of terminals whose respective profiles are to be allocated, the list of N ICCD profile identifiers, reserved for these N profiles, the list of N activation codes AC to be used for each terminal to be able to download a corresponding profile by connecting to the SER server.

It is understood that the above list of information is not exhaustive.

This data can be stored in step S4 in a database BD connected to the control server OPE.

In step S3, the N ICCID identifiers, in correspondence with the activation codes AC, are transmitted to the SER server to be subsequently recognized, in particular for the global profile allocation operation presented later on with reference to FIG. 2.

At the end of this first global operation illustrated in FIG. 1, for each client CL, a multi-SIM offer and a set of terminals of the client can be defined, the parameters of which presented below are stored in step S4 in the database BD. In step S5, the control server OPE transmits the N activation codes AC in order to associate N profiles to the respective N terminals of the client CL.

As defined in paragraph 4.1 of the SG.22 technical specification, an activation code AC corresponds to a string of characters and includes different information elements separated by a "$" character. The activation code AC includes in particular:

an address of the SER server (SMDP+ server here) that a terminal can contact in order to download the profile to be installed in this terminal (and possibly an SMDP+ server identifier), and a data related to the activation code, typically a data called "MatchingID", allowing the control server OPE to verify whether it corresponds to a valid activation code for this MatchingID data, and whether an offer of a profile to be allocated is attached to this activation code, as discussed later on.

The multi-SIM command order is entered in the control server OPE, for example integrated into the information system of the operator in step S1, and for example validated in step S2, and then transmitted to the SMDP+ server (referred to as SER in FIG. 1) for an activation of N profiles in step S3. The SER server provides the OPE server with N activation codes AC corresponding to this activation of N respective profiles and the OPE server transmits these N codes to the client CL in step S5 so that the latter CL can then choose the profiles to be allocated to all his or her respective N terminals.

The multi-SIM offer is then defined, in an example of embodiment, in particular by:

the total number N of profiles allowed for this offer, and therefore of security processors for this offer (including the total number N1 of SIM physical cards and N2 of eSIM software modules), the list of profiles already allocated to these SIM cards and eSIM modules (ICCID-L), the list of pre-allocated and not yet allocated profiles (ICCID-P), the list of the N activation codes AC to be used for each terminal.

For each client terminal, it is also listed:

optionally an IMEI identifier of the terminal, or an integrated security processor identifier EID in the case of an eSIM module, and for each profile installed:

the identity of the profile, defined by the ICCID identifier, being further provided that if the EID or IMEI is not yet defined (because for example the terminal in which the profile is to be uploaded is not yet determined), then the ICCID can, in an example of embodiment, replace the record of the e-SIM identifier, the offer to which this profile is attached, an installation status of the profile: "in progress" or "installed" (for eSIM modules in particular).

Figure 2:
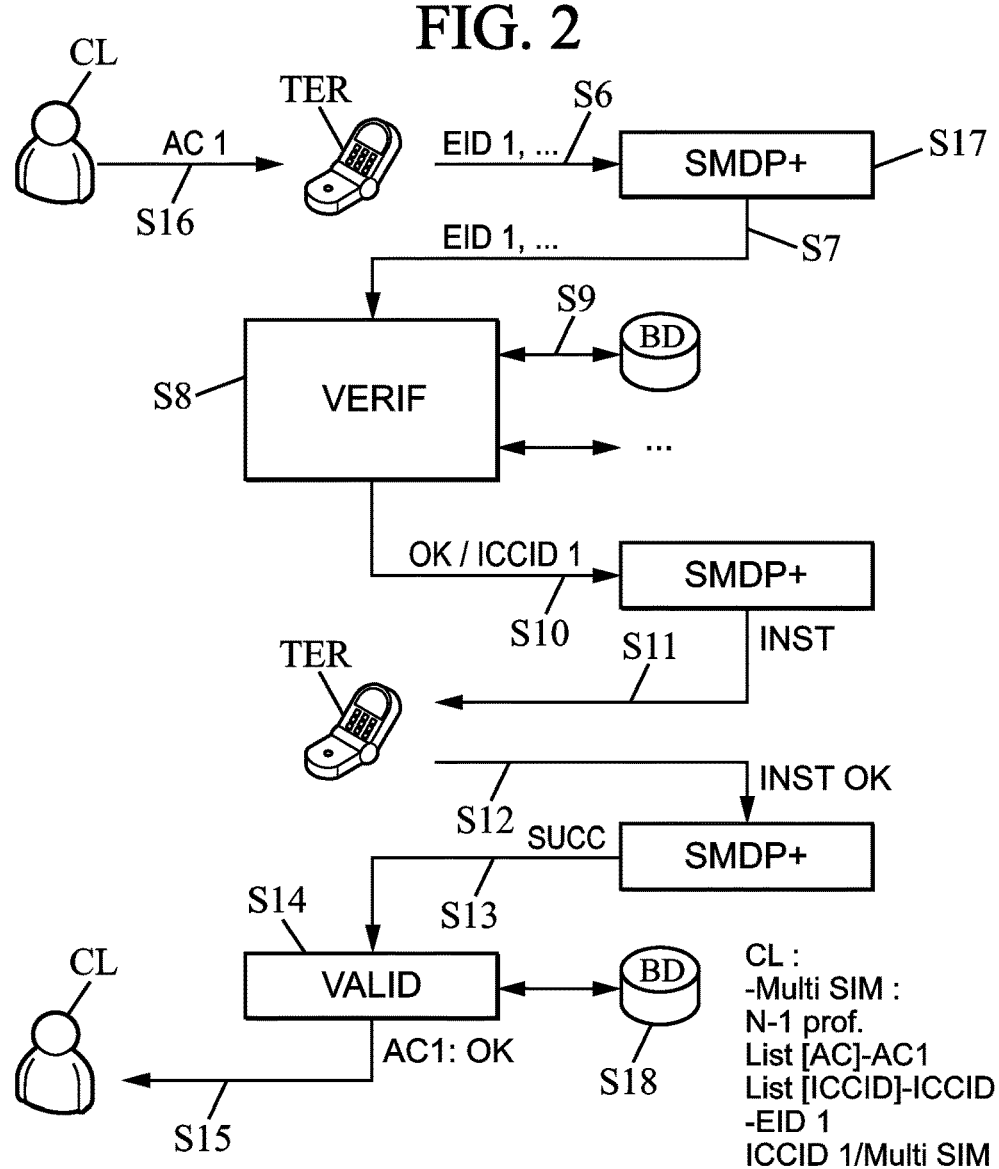
FIG. 2 illustrates an overall operation of allocating a particular profile to a terminal TER.

The OPE server is then able to carry out verifications, for example when receiving a prior request for obtaining an authorization to download the profile (beginning of the steps in FIG. 2 discussed later on), or upon receipt of a profile installation (the rest of the steps in FIG. 2).

With reference to FIG. 2, the client CL enters, in a terminal TER of his or her choice among a set of N terminals, a first activation code AC in step S16. This is one of the N activation codes that the client CL received in step S5. In response to the introduction of this AC code, the terminal TER connects to the SER server and transmits to the SER server, in step S6, a MatchingID data related to this activation code AC1, also with the e-SIM module EID identifier that the terminal includes (without a physical SIM card in the example shown).

In step S17, the SER server can, depending on the MatchingID data corresponding to this activation code AC1, find an ICCD profile identifier provided (in steps S2 and S3 above) for this activation code AC1. In step S7, the SER server transmits this data (EID1, MatchingID, ICCID) to the control server OPE, which in step S8 verifies this data to authorize the download of a profile. For example, in step S7, a SMDP+ type server SER can specify the MatchingID, the EID identifier, the ICCD profile identifier that the SER server received prior to step S3, and possibly in addition (depending on the configuration or capabilities of the SMDP+ server) a profile request context identifier.

The control server OPE, in step S8, can use the MatchingID data, and/or the ICCID identifier, and/or the context identifier to find the context of the requested processing.

At this step S8, the control server OPE validates the activation determined by the MatchingID data, or rejects the activation if necessary (as shown below), when the activation is outdated (for example due to an activation code that was already used), or other.

To do this, in step S9, the control server OPE accesses the repository of the client in the database and searches for the EID1 identifier of the e-SIM module of the terminal TER.

If the EID1 identifier is already referenced in the database, the control server OPE searches for the offer with which the received ICCD profile identifier is associated.

The control server OPE then verifies whether, under the record of the EID1 identifier, there is already an allocated profile listed, whose attached offer is identical to the offer whose profile is the subject of this download request.

If such profile already exists and has therefore already been allocated, then the download request is rejected. Otherwise, the download request is authorized. In the latter case (if the request is authorized), then the ICCD profile identifier presented by the SMDP+ server is referred to in the database BD as an allocable profile. Thus, a future profile request based on the same EID1 or ICCID identifier may be rejected, as discussed later in FIGS. 3 and 4.

In this case again (if the request is authorized), a status of the profile allocation process is optionally provided, which is then set to "in the process of being allocated". In this case again (if the EID-1 identifier is not referred to as having an associated allocated profile), authorization is given and:
- the e-SIM module identifier EID-1 is recorded in the database BD as having a current profile allocation,
- the ICCID identifier is recorded as a candidate ICCID1 profile identifier currently being allocated, and
- in step S10, the control server OPE transmits to the SER server an authorization to upload a profile with the ICCID identifier (corresponding to the ICCID1 identifier now referenced in the database BD).

Upon receipt of this permission, the SER server effectively transmits the data from this profile to the terminal TER in step S11 for installing it in the terminal TER. Once the installation is successful, the terminal sends a success message to the SER server in step S12, which transmits this message to the control server OPE in step S13.

More specifically, in step S13, the SER server specifies the MatchingID data, the ICCID-1 identifier, the EID-1 identifier, and possibly a context identifier to the control server OPE (for example: profile "in the process of being allocated"). The control server OPE, with this data, uses the MatchingID data, or the ICCID-1 identifier, or the context identifier to find the context of the requested processing, and accesses step S14 of the database BD in the repository of the client in order to search for the offer with which the received ICCID-1 identifier is associated and continue the usual steps of validation/profile installation/association of a billing account, etc. The status of the method is then set to "installed profile" in the database BD in step S18. In addition, the number of profiles remaining to be allocated is decreased, as well as the list of usable activation codes (AC1 being removed) and the list of allocable ICCID-P profile identifiers (ICCID1 identifier removed). The ICCID1 identifier is added to the list of profile identifiers already allocated to ICCID-L. In step S15, the control server OPE sends a profile installation validation message on the terminal TER to the client CL (possibly via the terminal TER itself).

Figure 3:
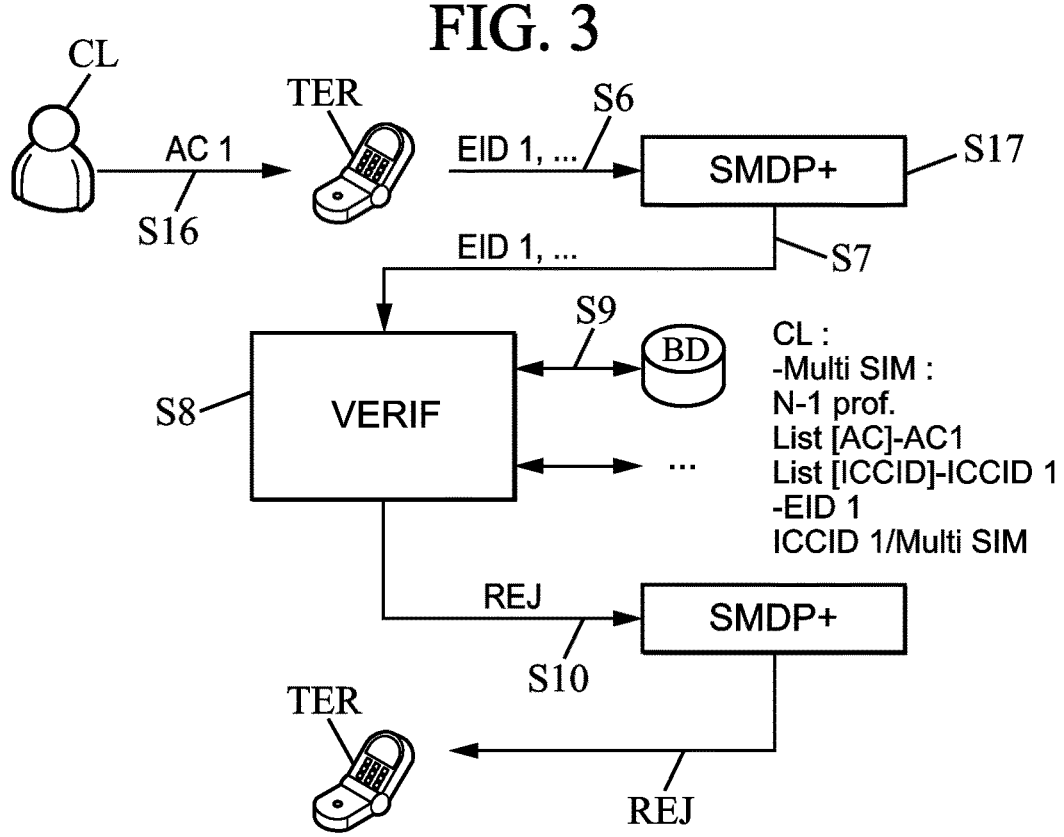
FIG. 3 illustrates a first case of rejection of a profile allocation request, if this profile has already been allocated.

Thus, with reference to FIG. 3, in step S8, the control server OPE rejects the activation if an AC1 activation code has already been used for the previous download of an ICCID1 identifier profile. The profile allocation request is rejected, here. In step S10, the control server OPE transmits to the SER server a profile upload rejection with the ICCID1 identifier. The SER server notifies the terminal of the client CL of this rejection. In the example shown in FIG. 3, it should be noted that the terminal has the same e-SIM (EID1) identifier as the one allocated to the ICCID1 profile. However, in one possible embodiment, the presentation of an activation code AC1 for a new EID2 identifier terminal may allow the ICCID1 profile to be allocated to the new EID2 terminal. In this case, the association of the ICCID1 profile with the EID1 terminal is deleted from the repository of the client CL and more generally from the database BD.

Figure 4:
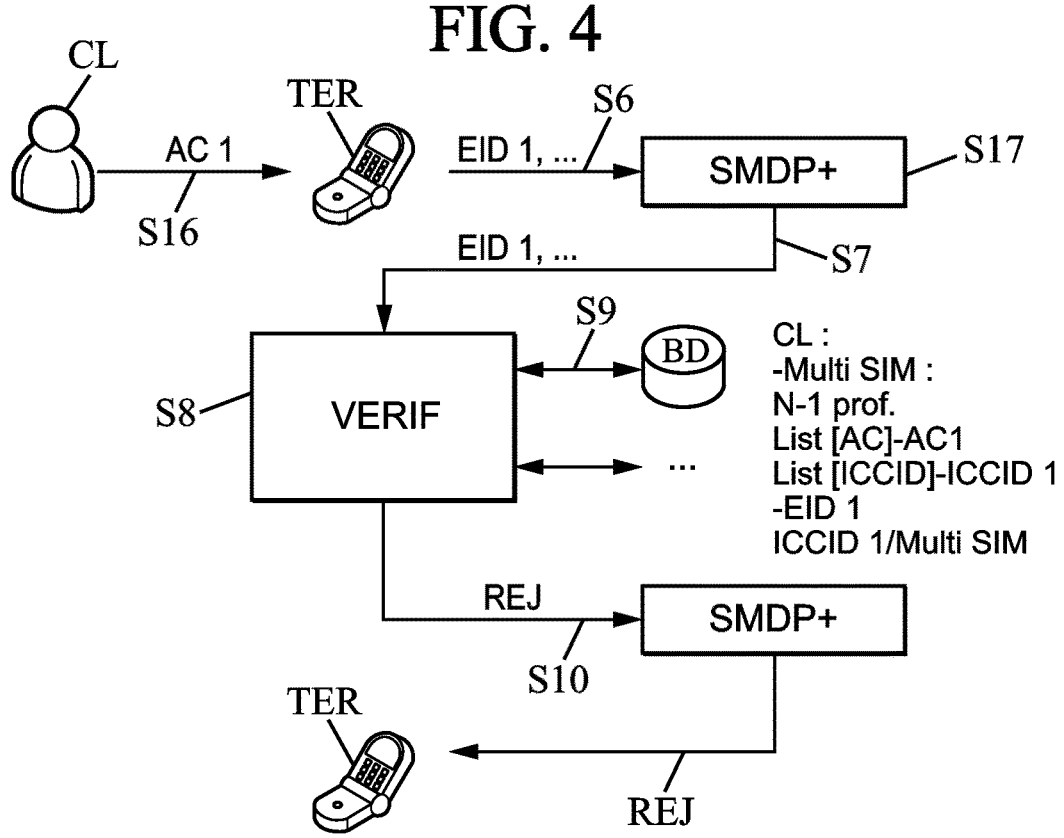
FIG. 4 illustrates a second case of rejection of a request to allocate a profile to a terminal, if a profile has already been allocated to that terminal.
Figure 5:
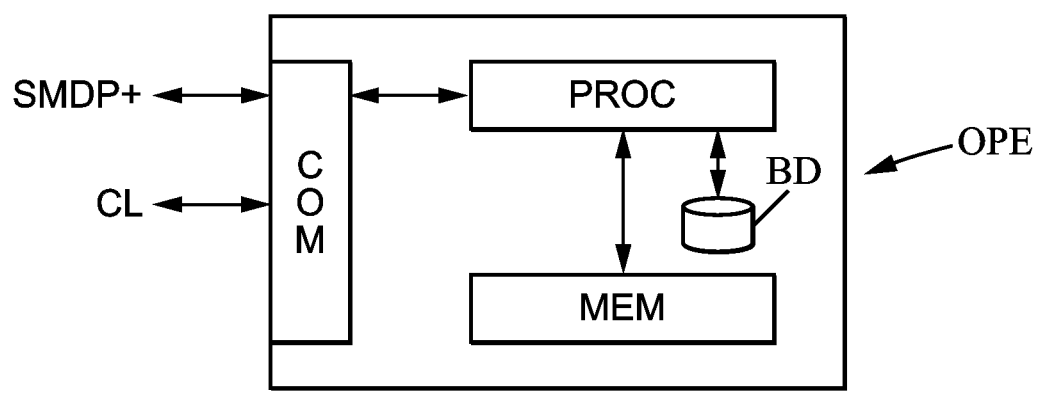
FIG. 5 presented above schematically illustrates the hardware structure of an example control server.

In addition, with reference now to FIG. 4, in step S8, the control server OPE rejects the activation if it is sought to allocate a profile (with a new activation code AC2, different from the AC code) to a terminal having an e-SIM EID1 identifier that is already associated with an ICCID1 profile already allocated to that terminal, then the request to allocate the new profile is rejected. In step S10, the control server OPE transmits to the SER server a profile upload rejection with the ICCID1 identifier. The SER server notifies the terminal of the client CL of this rejection. In this case, for example, the control server OPE may seek to contact the CL user to confirm its choice to disassociate this terminal from the ICCID1 profile and give permission to associate a new ICCD2 profile with it instead. In this case again, the ICCID profile may become available again in the multi-SIM offer of the client CL in order to be allocated to another EID2 terminal.

Of course, the present invention is not limited to the embodiments described above as examples; it extends to other variants.

Thus, for example, in a possible embodiment, it may be possible to use a probe for example to obtain identifier information from the terminal itself (IMEI-type, or the IMSI identifier stored in the SIM card). For example, the IMSI identifier can be used by the control server OPE to find the client CL, the associated offer, and the ICCID identifier with which the terminal has been associated. For example, the control server OPE can search for the ICCID identifier in the entire database BD globally (all clients). If an ICCID identifier record is found and is associated with the same IMEI terminal identifier (IMSI or EID) as specified, then processing stops and there is no need to update the database. Otherwise, an update can be carried out.

In addition, in the examples of embodiments presented above, the information of an IMEI or IMSI identifier is advantageous but not necessary, especially since the EID identifier can be obtained in particular for terminals with integrated e-SIM modules.

In addition, the possibility of storing the total number N of profiles authorized for an offer, and therefore of security processors for this offer (comprising a total number N1 of physical SIM cards and a number N2 of eSIM software modules, with N=N1+N2) has been described above. It may also be advantageous to further count, in an optional embodiment:
- the number m2 of eSIM modules already issued, and
- the number m1 of SIM cards already issued.

Thus, the control server OPE can manage requests for downloads or SIM cards issued. The control server OPE is able to keep a trace, in the form of such m1, m2 counters, of the various allocations to ensure that the number N of total profiles is not exceeded.

Such embodiment is particularly advantageous in the context of an evolution of terminals with an integrated e-SIM module, but called "hybrid" because a physical SIM card can be inserted into them. Additional processing may be implemented to reference the profile of such SIM card inserted, in the offer repository provided for the eSIM modules associated with the offer, in order to provide complete information on the profiles and terminals held by each client in an offer (particularly with support services).

Thus, the repository not only makes it possible to know how to manage cases of inconsistency but also offers a view on what is held and what is installed at the client's premises, in order to be able to offer quality support.

The principles of this additional processing can be based, for example, on the detection of the IMEI/IMSI identifier pair (a probe can meet this need, other solutions also exist). The detected IMEI terminal identifier identifies the device into which a SIM card is inserted. The detected IMSI card identifier allows the operator to find the active ICCID profile to which this IMSI identifier belongs. This information also makes it possible to identify the offer to which this profile has been allocated and thus to identify the client. Knowledge of the profile (of ICCID identifier) makes it possible to distinguish the profile belonging to a SIM card from that belonging to an eSIM module. Only the profile of a SIM card is used for the rest of the additional processing, the principle of which is described below.

The ICCID identifier is attached to the offer of the client in the repository. Its value is recorded in correspondence with the offer held by the client (if this has not already been the case before). If this ICCID identifier is already referenced, then it is verified that the value of the recorded IMEI corresponds to the one detected. If this is already the case, then the repository is already up to date. Otherwise, this IMEI value is modified by the newly detected value (for example by the above-mentioned probe).

If the update of the IMEI identifier has been necessary, then it is assumed that the SIM has been introduced into a new terminal, and therefore the possible ICCID reference stored in correspondence with another IMEI terminal identifier (which is de facto no longer updated for this SIM card) must be deleted.

It is therefore advisable to search for this IMEI identifier in the repository of the clients and to verify that there is a match with a SIM card profile that is different from the profile that has been detected. In this case, the value of the ICCID identifier contained in the repository found and corresponding to the detected value can simply be deleted.

Although the present disclosure has been described with reference to one or more examples, workers skilled in the art will recognize that changes may be made in form and detail without departing from the scope of the disclosure and/or the appended claims.

The invention claimed is:

1. A method, implemented by a control server, for configuring a security module associated with a telecommunication terminal, comprising:
   allocating a set of N activation codes corresponding to a subscription comprising a plurality of N profiles to be allocated to a set of N respective terminals, each of the N activation codes including an address of an access server that a terminal can contact in order to download a profile to be installed in said terminal, which comprises:
      a) after activation of a first code in a first terminal, allocating a profile to the first terminal and recording an association of the allocated profile with the first terminal; and
      b) for a new request to allocate a current profile to a current terminal, allocating the current profile to the current terminal if:
         no association of this current terminal with a profile is recorded, and
         no association of this current profile with a terminal is recorded,
         and recording the association of the current profile with the current terminal,
   and wherein, before the current profile is allocated to the current terminal, data from the current terminal related to the new request to allocated the current profile to the current terminal is received at the control server by transiting via the access server,
   and, once the current profile is allocated to the current terminal the control server sends data for installing the current profile in the current terminal to the access server for transmission to the current terminal by the access server.

2. The method according to claim 1, wherein the control server rejects the request to allocate the current profile to the current terminal if an association of this current terminal with a profile is recorded.

3. The method according to claim 1, wherein the control server rejects the request to allocate the current profile to the current terminal if an association of this current profile with a terminal is recorded.

4. The method according to claim 1, wherein the subscription comprising a plurality of N profiles to be allocated to a set of respective N terminals is related to a multi-SIM-type offer.

5. The method according to claim 1, comprising, prior to act a), recording N profiles and N activation codes, in association with said subscription, and wherein:
   b) for a new request to allocate a current profile to a current terminal and based on one of the N activation codes of said set, the control server allocates the current profile to the current terminal if:
      no association of this current terminal with a profile is recorded, and
      no association of this current profile with a terminal is recorded,
      and records the association of the current profile, identified among the N profiles of the subscription, with said current terminal.

6. The method according to claim 5, wherein the control server communicates with a computer entity having a man/machine interface available to a client of said subscription, to receive from the client at least the number N of profiles to be allocated to respective terminals of the client.

7. The method according to claim 1, wherein after entering the current activation code in the current terminal, the control server:
   receives from this current terminal at least one security module identifier associated with the terminal, and
   verifies whether a profile among the N profiles has already been allocated for a terminal with said security module identifier.

8. The method according to claim 1, wherein the security module is a software module embedded directly in the terminal.

9. The method according to claim 1, wherein, after entering a current activation code in a terminal, the control server receives from that terminal at least one data corresponding to the current activation code and allowing the control server to verify whether a profile corresponding to the current activation code has already been associated with a terminal.

10. A non-transitory computer-readable medium comprising a computer program stored thereon, comprising software instructions for implementing a method for configuring a security module associated with a telecommunication terminal, when this program is executed by a processor of a control server, wherein the program configures the control server to allocate a set of N activation codes corresponding to a subscription comprising a plurality of N profiles to be allocated to a set of N respective terminals, each of the N activation codes including an address of an access server that a terminal can contact in order to download a profile to be installed in said terminal, which comprises:
   a) after activation of a first code in a first terminal, allocating a profile to the first terminal and recording an association of the allocated profile with the first terminal; and
   b) for a new request to allocate a current profile to a current terminal, allocating the current profile to the current terminal if:
      no association of this current terminal with a profile is recorded, and
      no association of this current profile with a terminal is recorded,
      and recording the association of the current profile with the current terminal, and wherein, before the current profile is allocated to the current terminal, data from the current terminal related to the new request to allocated the current profile to the current terminal is received at the control server by transiting via the access server, and, once the current profile is allocated to the current terminal, the control server sends data for installing the current profile in the current terminal to the access server for transmission to the current terminal by the access server.

11. A control server, comprising:

at least one processing circuit arranged to configure a security module associated with a telecommunication terminal, wherein the configuring comprises allocating a set of N activation codes corresponding to a subscription comprising a plurality of N profiles to be allocated to a set of N respective terminals, each of the N activation codes including an address of an access server that a terminal can contact in order to download a profile to be installed in said terminal, which comprises:

a) after activation of a first code in a first terminal, allocating a profile to the first terminal and recording an association of the allocated profile with the first terminal; and b) for a new request to allocate a current profile to a current terminal, allocating the current profile to the current terminal if:

no association of this current terminal with a profile is recorded, and no association of this current profile with a terminal is recorded, and recording the association of the current profile with the current terminal, and wherein, before the current profile is allocated to the current terminal, data from the current terminal related to the new request to allocated the current profile to the current terminal is received at the control server by transiting via the access server, and, once the current profile is allocated to the current terminal, the control server sends data for installing the current profile in the current terminal to the access server for transmission to the current terminal by the access server.

12. The control server according to claim 11, further including a communication interface with an access server.

13. The control server according to claim 11, including a communication interface with a computer entity including a man/machine interface available to a client of the subscription to record at least a number N of profiles associated with the subscription and to be allocated.

* * * * *